United States Patent [19]

Alvino

[11] Patent Number: 5,864,097
[45] Date of Patent: Jan. 26, 1999

[54] APPARATUS FOR DETERMINING THE AMOUNT OF MEDICATION IN A CLOSED DISPENSER

[76] Inventor: Frank J. Alvino, 8 Tanglewood Rd., North Caldwell, N.J. 07006

[21] Appl. No.: 856,740

[22] Filed: May 15, 1997

[51] Int. Cl.$^6$ ........................................ G01G 3/02
[52] U.S. Cl. ........................ 177/232; 177/233; 177/245; 177/50
[58] Field of Search ............... 177/50, 131, 232, 177/233, 245, 225, 231

[56] References Cited

U.S. PATENT DOCUMENTS

| | | | |
|---|---|---|---|
| 374,759 | 12/1887 | Segog | 177/232 |
| 3,319,730 | 5/1967 | Cuddon-Fletcher | 177/245 |
| 3,687,209 | 8/1972 | Goldberg et al. | 177/233 |
| 4,524,617 | 6/1985 | Krehel et al. | 177/245 |
| 5,319,162 | 6/1994 | Ness | 177/231 |
| 5,579,759 | 12/1996 | Gantz | 177/207 |

*Primary Examiner*—Randy W. Gibson
*Attorney, Agent, or Firm*—Schweitzer Cornman Gross & Bondell LLP

[57] ABSTRACT

An apparatus for measuring the amount of medication in a sealed metered dose inhaler dispenser comprises a housing in which a mounting platform is located. An aperture in the housing allows the dispenser to be placed on the platform. Displacement of the platform is correlated with the weight of the dispenser and contents. The weight is displayed as an indication of the amount of medication in the dispenser from full to empty. The platform means may rest on a compression spring, the deflection of the spring being correlated with the applied weight. Tabs associated with the platform align with indicia on the exterior of the housing to indicate the degree of dispenser fill.

6 Claims, 2 Drawing Sheets

APPARATUS FOR DETERMINING THE AMOUNT OF MEDICATION IN A CLOSED DISPENSER

BACKGROUND OF THE INVENTION

Devices for the therapeutic administration of asthma medication play a large and important part in the control of the disease. In addition to the preventative effects of regular prescribed dosing, with the onset of an asthma attack, it is of vital importance that therapeutic medication be administered promptly and in a proper amount. The most effective way to deliver asthma medication is by inhalation, and by far the most popular means for delivering the medication for inhalation is the metered dose inhaler (MDI) which allows the dispensation of a controlled amount of medication in an aerosol form.

The standard form for an MDI dispenser is a metal canister including an integral dose dispensation nozzle. The medication is under pressure within the canister, and each activation of the valve mechanism releases a measured or metered amount of the medication. Typically, a canister contains sufficient medication for approximately 200 doses.

A major deficiency of the MDI is the lack of a visual dose counter to advise the patient as to the amount of medication remaining in the canister. Accordingly, the patient must be extremely cautious in determining when a canister should be discarded and a new canister used. While patients can become somewhat adept in determining the approximate amount of medication remaining by hefting the canister, or by placing it in water and observing the degree of buoyancy, such procedures provide only general indications of the fill status of the canister. Other, similar attempts to determine the likely useful life of a canister, such as by dividing the number of daily doses prescribed into the number of needed actuations specified by the manufacturer of the canister, can similarly only serve as a guideline. Further complicating the ultimate decision is that, although medication may remain in the canister, proper dosing cannot be assured after a specified number of actuations. Thus, while the canister may appear to remain viable for use, due to the existence of medication therein, there still remains a risk that an incorrect amount of medication will be dispensed if the medication level is too low.

It is accordingly a purpose of the present invention to provide an apparatus which allows the amount of medication in an MDI canister to be determined with practical accuracy.

A further purpose of the present invention is to provide an apparatus for determining the amount of medication in an MDI canister which is convenient and portable.

Yet another purpose of the present invention is to provide an apparatus of the aforementioned type which is accurate, easy to read, and efficient in operation.

BRIEF DESCRIPTION OF THE INVENTION

In accordance with the foregoing and other objects and purposes, an apparatus for measuring the amount of medication in an MDI canister constructed in accordance with the present invention comprises a housing having an aperture into which an MDI dispenser sought to be measured is inserted. The aperture allows the MDI dispenser to be placed upon an internal weighing platform, such as a spring-loaded pedestal. The degree of force exerted upon the weighing platform, and thus compression of the spring, the displacement of the pedestal, is proportional to the weight of the canister and its contents. As a fully-loaded canister itself is of standard weight, variations in the weight of the canister and contents is due to the amount of medication therein. A readout of the weight of the canister, such as by the degree of displacement of the pedestal, is displayed and can thus be equated to the amount of medication in the canister. An indicator can be affixed to the pedestal, with appropriate indicia placed on the housing proximate the indicator path, to correspond to levels of medication remaining.

BRIEF DESCRIPTION OF THE DRAWINGS

A fuller understanding of the present invention and the features and operation thereof will be accomplished upon consideration of the following detailed description of a preferred, but nonetheless illustrative embodiment of the invention, when reviewed in association with the annexed drawings, wherein.

DETAILED DESCRIPTION OF THE INVENTION

Figure 1:
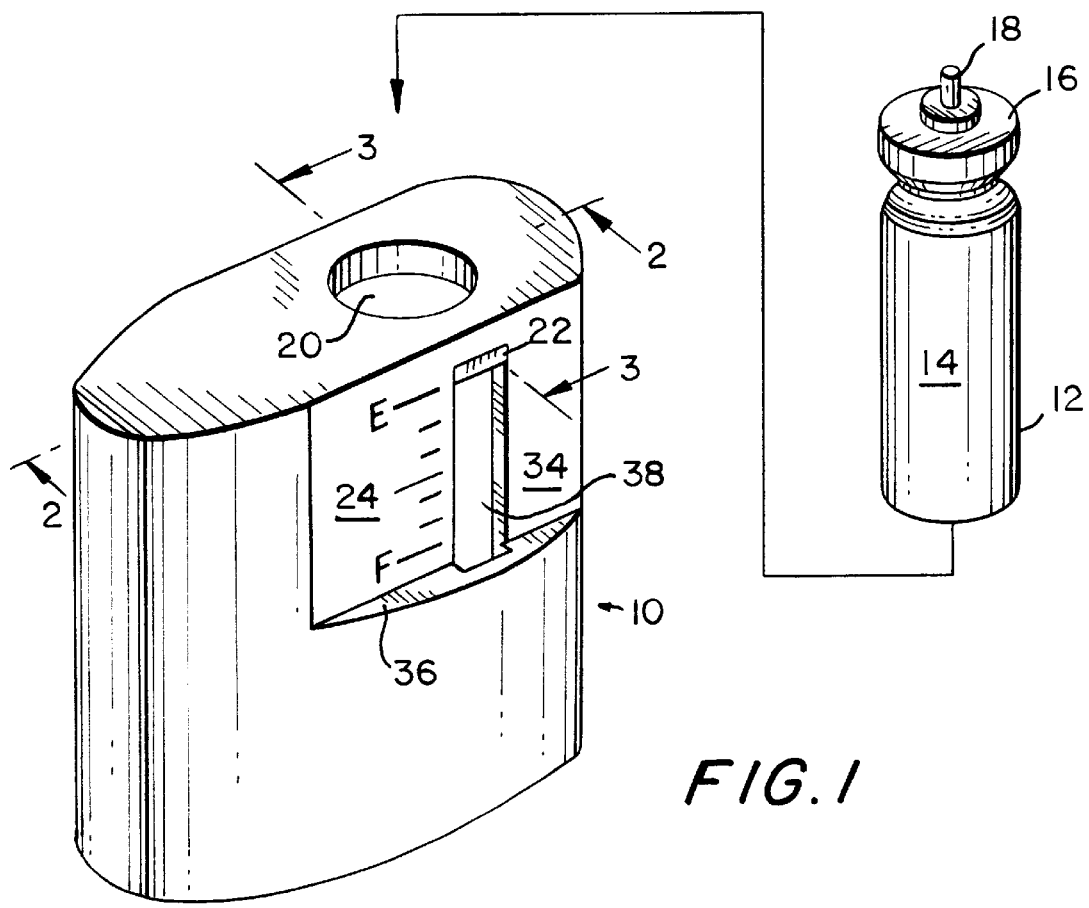
FIG. 1 is a perspective view of an MDI medication measuring apparatus of the present invention shown in association with a typical MDI dispenser.

With initial reference to FIG. 1, the medication measuring apparatus 10 of the present invention is intended to be utilized in connection with a conventional MDI canister 12. The canister comprises a cylindrical canister body 14 having a top cap 16 which includes an integral medication metering valve 18. The canister is inserted, top up, into the reception aperture 20 on the top surface of the apparatus. The degree of displacement of a spring-loaded piston serving as a weighing platform upon which the canister is placed is indicated by the position of indicator 22. Indicia 24 on the side of the apparatus provide reference markers to determine the amount of medication in the canister.

Figure 2:
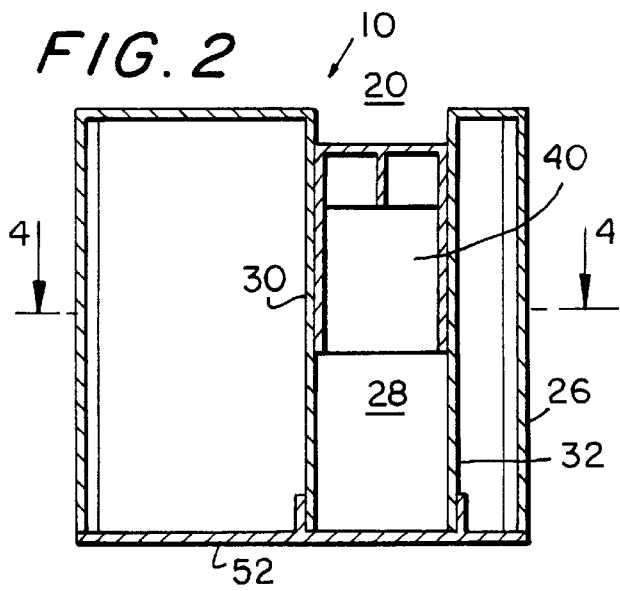
FIG. 2 is an elevation view in section taken along line 2—2 of FIG. 1.
Figure 3:
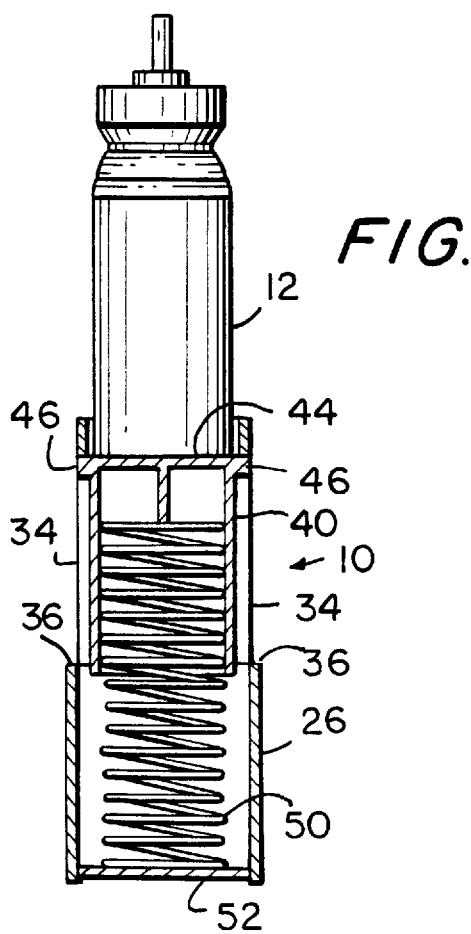
FIG. 3 is an elevation view in section taken along line 3—3 of FIG. 1 with an MDI dispenser placed in the apparatus.
Figure 4:
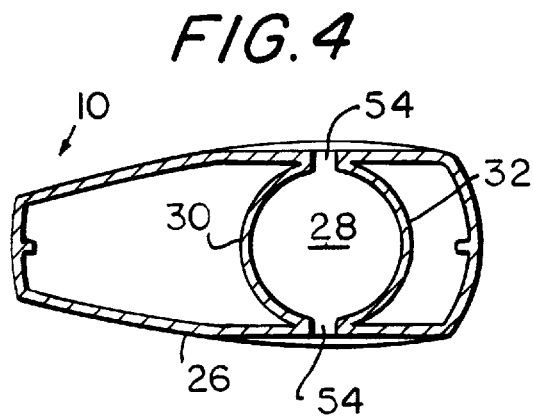
FIG. 4 is a plan view in section taken along line 4—4 of FIG. 2 (with the piston omitted)

With further reference to FIGS. 2 through 5, apparatus 10 may preferably be in the form of a generally rectangular parallelepiped housing 26 constructed of an appropriate plastic. Its outer surface may be gently contoured. The housing may be essentially hollow, as seen in FIGS. 2 and 4, and includes a vertically-extending cylindrical chamber portion 28 formed by opposed semicircular interior housing walls 30, 32. A pair of vertical slots or channels 54 are formed by the adjacent vertical edges of the walls. The diameter of the cylindrical chamber 28 is chosen to comfortably accommodate the canister 12. The cylindrical portion aligns with the reception aperture 20 in the canister top surface.

The slots 54 also extend into the respective opposed sides of the housing. As best seen in FIGS. 1 and 3, the housing sides each include an inset wall portion 34 of decreased wall thickness, terminating at a lower ledge 36. The depth of slots 54 into the side walls is such that they extend through the inset wall portions, each creating a vertically-extending rectangular window in each of the inset portions. The slots form a pair of tracks to control the travel for a piston 40.

Figure 5:
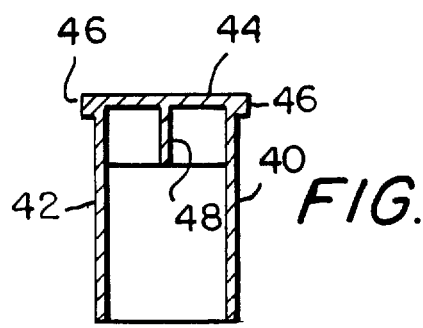
FIG. 5 is an elevation view in section of the piston.

Piston 40, as detailed in FIG. 5, is mounted for vertical travel within the cylindrical chamber 28. The piston 40 is circular in plan, having a generally hollow body formed by a cylindrical side wall 42 capped by circular top wall 44 serving as the MDI dispenser-receiving platform. A pair of opposed tabs 46 project outwardly at the upper end of the piston, and are dimensioned to fit within the slots 54, projecting through the windows 38. In addition to serving as visual indicators for the position of the piston, the tabs 46 also maintain alignment of the piston within the cylindrical chamber. To provide additional rigidity, a pair of internal perpendicular ribs 48 are located within the piston proximate the top wall thereof.

A compression spring 50, having a diameter which permits it to be inserted within the piston 40, biases the piston upwardly within the housing, and against the weight of the MDI dispenser to be weighed. The top end of the spring bears against the piston ribs 48. A bottom piece 52 seals the bottom open end of the housing 26, and supports the bottom end of the spring 50. The limit of upward travel of the piston is defined by contact between the piston tabs 46 and the upper ends of the windows 38, while travel downward, under the weight of the canister 14 to measured, ends when the lower end of the piston contacts the housing bottom 52.

The spring constant and dimensions of the spring, as well as the length of the piston, are preferably chosen to allow compression of the spring to the extent that the piston top wall is proximate the bottom of the windows when a fully-loaded canister is placed on the piston and the top of the piston is proximate, but not in contact with, the top of the window when an empty canister is on the piston.

As shown in FIG. 3, the canister 12 is inserted within the aperture 20 to sit upon the top wall 44 of the piston 40. The weight of the canister and contents compresses the spring 50, the extent of compression being proportional to the weight of the canister and contents. The piston tabs 46, viewable from the exterior of the housing through the windows 38, provide a visual indication of the relative position of the piston and thus spring compression, and correlate to the total weight of the canister and contents, as may be calibrated and displayed through indicia 34. Because the piston tabs project from opposite sides of the piston and travel in separate windows 38, piston travel can be correlated to two different brands or types of canisters, the appropriate indicia 24 therefor being shown on separate and opposite wall portions 34. The apparatus being of relatively compact and simple construction, it may be used in a variety of environments, and can be always available for providing an indication of the amount of medication remaining in the canister.

I claim:

1. An apparatus for measuring the amount of medication in a sealed MDI dispenser, comprising:

a housing in the general form of an upright parallelepiped having a top wall and opposed side walls;

a cylindrical chamber in said housing terminating in an aperture in said top wall, said chamber and aperture adapted to accept the MDI dispenser in an upright orientation;

a weighing platform within said cylindrical chamber upon which the MDI dispenser rests, said weighing platform including a horizontally-extending top and downwardly-extending skirt means about the periphery thereof for maintaining the orientation of said top and for permitting sliding motion of the weighing platform within the chamber;

a compression spring within said chamber having a first end extending upwardly within said skirt and in contact with a bottom surface of the weighing platform top and a second end extending downwardly beyond the skirt for contact with a bottom surface of the chamber; and display means for indicating the amount of medication in the canister based upon the weight determined by the weighing means.

2. The apparatus of claim 1, wherein said display means comprise a position indicator mounted to said platform observable from the exterior of said housing.

3. The apparatus of claim 2, wherein at least one of said side walls has a vertical slot, said weighing platform having projecting tab means extending into said slot for retaining said weighing platform within said chamber and preventing rotation of said weighing platform within said chamber, said tab means further comprising said position indicator.

4. The apparatus of claim 3, wherein a second side wall has a second vertical slot, said weighing platform having a second projecting tab means extending into said second slot for maintaining said piston within said chamber and preventing rotation of said platform within said chamber, said first tab comprising display means associated with a first MDI dispenser, said second tab comprising display means associated with a second MDI dispenser.

5. The apparatus of claim 3, wherein said at least one of said side walls is formed with a horizontal exterior ledge, a portion of the side wall above the ledge being inset from a portion of the side wall below the ledge, said vertical slot extending through said side wall portion above the ledge, said display means comprising indicia about said slot and upon the side wall portion above the ledge.

6. The apparatus of claim 5, wherein said vertical slot extends downwardly beyond the ledge upon an interior surface of the side wall portion below the ledge.

* * * * *

UNITED STATES PATENT AND TRADEMARK OFFICE
CERTIFICATE OF CORRECTION

PATENT NO.   : 5,864,097
DATED        : January 26, 1999
INVENTOR(S)  : Frank J. Alvino, et. al.

It is certified that error appears in the above-identified patent and that said Letters Patent is hereby corrected as shown below:

Title page, item [76], inventors: should read -- Frank J. Alvino and Steve Bellofatto --.

Signed and Sealed this

Twenty-third Day of March, 1999

Attest:

Q. TODD DICKINSON

*Attesting Officer*        *Acting Commissioner of Patents and Trademarks*